(12) United States Patent  
Cawthorne et al.

(10) Patent No.: US 8,029,240 B2
(45) Date of Patent: Oct. 4, 2011

(54) ROTOR BLADE ADJUSTABLE WEIGHT RETENTION SYSTEM

(75) Inventors: Matthew H. Cawthorne, Newtown Square, PA (US); Steven J. Spear, Chalfont, PA (US); Christopher J. Cline, Glen Mills, PA (US)

(73) Assignee: The Boeing Company, Chicago, IL (US)

( * ) Notice: Subject to any disclaimer, the term of this patent is extended or adjusted under 35 U.S.C. 154(b) by 999 days.

(21) Appl. No.: 11/937,366

(22) Filed: Nov. 8, 2007

(65) Prior Publication Data

US 2011/0002785 A1    Jan. 6, 2011

(51) Int. Cl.
    *F01D 5/02* (2006.01)
(52) U.S. Cl. .......... 416/134 A; 416/139; 416/144; 416/145; 416/500
(58) Field of Classification Search .......... 416/134 A, 416/139, 140, 144, 145, 500
    See application file for complete search history.

(56) References Cited

U.S. PATENT DOCUMENTS

| | | | | |
|---|---|---|---|---|
| 2,451,541 A | * | 10/1948 | Doman | 416/145 |
| 2,494,756 A | * | 1/1950 | Gruetjen | 416/145 |
| 3,812,724 A | * | 5/1974 | Curtz et al. | 73/458 |
| 4,150,920 A | * | 4/1979 | Belko et al. | 416/145 |
| 5,273,398 A | * | 12/1993 | Reinfelder et al. | 416/144 |
| 6,139,271 A | | 10/2000 | Chadwick | |
| 6,196,066 B1 | | 3/2001 | Barbier | |
| 7,118,343 B2 | | 10/2006 | Loftus et al. | |

FOREIGN PATENT DOCUMENTS

| | | |
|---|---|---|
| DE | 3514631 C1 | 4/1985 |
| DE | 3607374 C1 | 3/1986 |
| WO | WO 94/13530 | 6/1994 |

OTHER PUBLICATIONS

International Search Report dated Mar. 4, 2009 for Application No. GB0820488.5, 6 pages.

* cited by examiner

*Primary Examiner* — Igor Kershteyn
(74) *Attorney, Agent, or Firm* — Klintworth & Rozenblat IP LLC (57) ABSTRACT

In one embodiment, a rotor blade balancing apparatus may include a tube member defining an inner cavity, a plurality of weights, and a biasing member. The tube member may be for the insertion into a cavity of a rotor blade. Each of the weights may be adapted to be slide-ably inserted into the inner cavity of the tube member within a cavity of a rotor blade, and slide-ably removed from the inner cavity of the tube member within a cavity of a rotor blade in order to balance a rotor blade. The biasing member may be for biasing weights, which have been slide-ably inserted into the inner cavity of the tube member within a cavity of a rotor blade, towards an end of the tube member.

25 Claims, 10 Drawing Sheets

ROTOR BLADE ADJUSTABLE WEIGHT RETENTION SYSTEM

BACKGROUND

Rotor blades, such as helicopter blades, often require adjustable, fine-tuning weights to reduce vibration induced by differences between rotor blades. The differences can be due to initial manufacturing, erosion/wear, repairs/maintenance, and/or weight gain due to moisture ingress. The weights are typically buried in the rotor blade or made flush to avoid performance losses due to aerodynamic drag. Many of the existing rotor blade balancing apparatus and/or methods of balancing rotor blades rely on threaded fasteners to retain the weight while in flight. Threaded fasteners large enough to retain the weights under high centrifugal force and the attendant structure required into which the fasteners thread tend to be relatively heavy and require safety features so that the fastener does not vibrate loose and depart in flight. Many of the existing apparatus use metal boxes surrounding the weights to help transfer the loads from the weights to the surrounding structure. These enclosures tend to be heavy. The access cut-out areas are often large, with a significant structural impact and need for additional reinforcement. Further, many of the existing apparatus use an abundance of parts, are costly, require excessive time during balancing, and are difficult to implement.

A rotor blade balancing apparatus, and/or method of balancing a rotor blade is needed to decrease one or more problems associated with one or more of the existing rotor blade balancing apparatus and/or methods.

SUMMARY

In one aspect of the disclosure, a rotor blade balancing apparatus comprises: a tube member defining an inner cavity, wherein the tube member is for being inserted into a cavity of a rotor blade; a plurality of weights, wherein each of the weights are adapted to be slide-ably inserted into the inner cavity of the tube member within a cavity of a rotor blade and slide-ably removed from the inner cavity of the tube member within a cavity of a rotor blade in order to balance a rotor blade; and a biasing member for biasing weights, which have been slide-ably inserted into the inner cavity of the tube member within a cavity of a rotor blade, towards an end of the tube member.

In another aspect of the disclosure, a rotor blade balancing apparatus of a helicopter comprises: a helicopter rotor blade; a tube member defining an inner cavity disposed within a cavity of the helicopter rotor blade; a plurality of weights, wherein each of the plurality of weights are adapted to be slide-ably inserted into and slide-ably removed from the inner cavity of the tube member in order to balance the helicopter rotor blade; and a biasing member for biasing weights inserted into the inner cavity of the tube member towards an outer end of the helicopter rotor blade.

In still another aspect of the disclosure, a method for balancing a rotor blade comprises: determining that the rotor blade is out of balance; moving a biasing member which is disposed against a plurality of weights within a cavity of the rotor blade; and at least one of adding and removing weights from the cavity of the rotor blade to balance the rotor blade.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
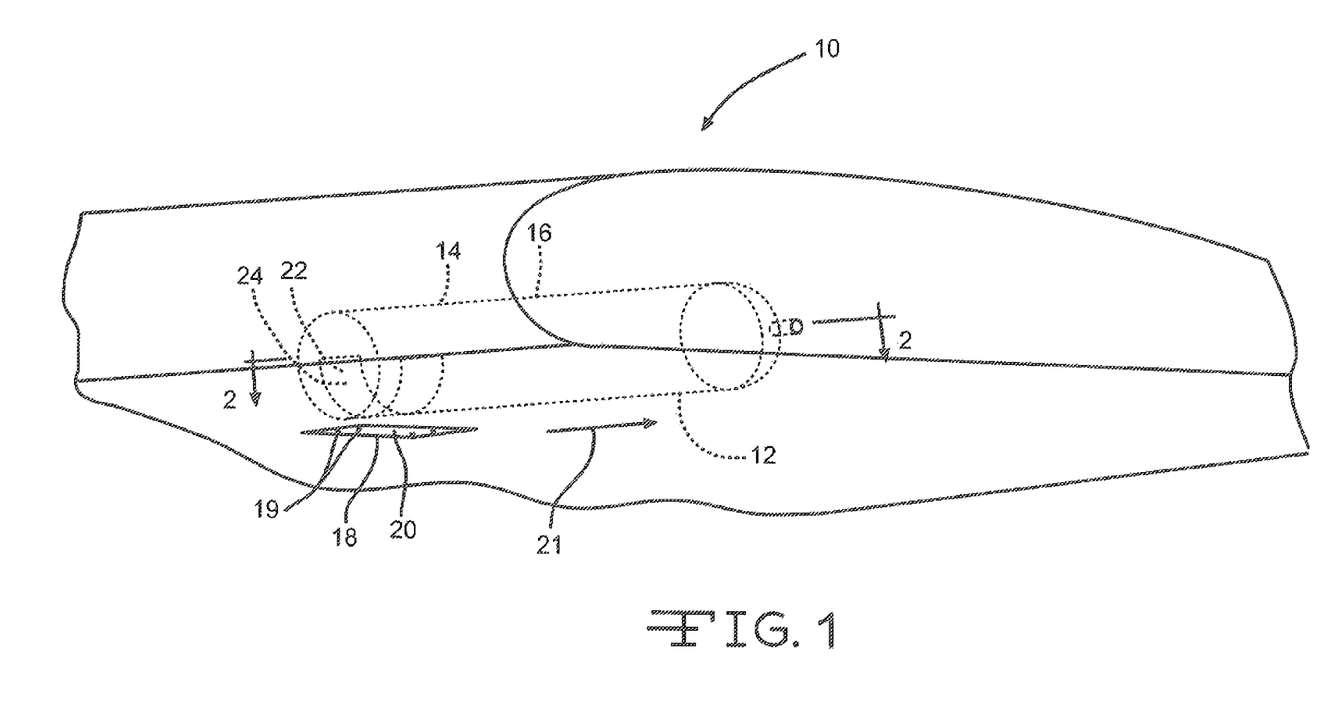
FIG. 1 shows a partial perspective view, under one embodiment of the disclosure with dashed lines showing hidden components, of a rotor blade having a rotor blade balancing apparatus attached to the rotor blade.

FIG. 1 shows a partial perspective view, under one embodiment of the disclosure with dashed lines showing hidden components, of a rotor blade 10 having a rotor blade balancing apparatus 12 attached to the rotor blade 10. The rotor blade 10 may be attached to a helicopter rotor system. The rotor blade balancing apparatus 12 comprises a tube member 14 disposed within a cavity 16 of the rotor blade 10. An access panel 18, which is attached to at least one of the rotor blade 10 and the tube member 14, covers an opening 20 in the rotor blade 10. The access panel 18 may be attached to and/or, detached from the rotor blade 10 and/or the tube member 14 by one or more attachment members 19. The attachment member 19 may comprise a bolt, a hinge, a snap-fit member, a spring loaded clip, a sliding system held in place by centrifugal force 21 and/or a spring, and/or other types of attachment mechanisms. The opening 20 in the rotor blade 10 may be aligned with an opening 22 in the tube member 14. In such manner, by moving and/or removing the access panel 18 to gain access to the openings 20 and 22, access may be gained to an inner cavity 24 disposed within the tube member 14.

Figure 2:
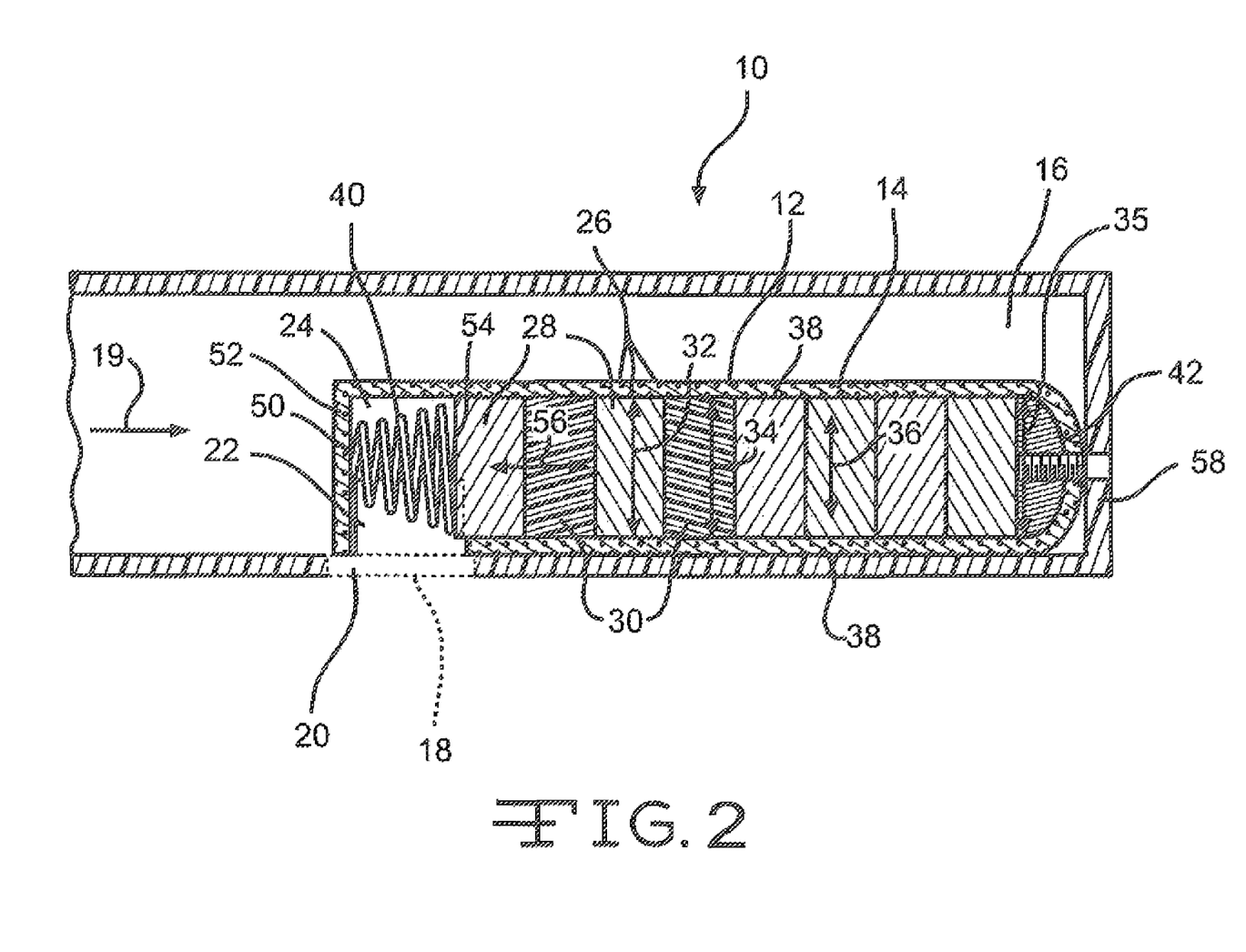
FIG. 2 shows a partial cross-section view through line 2-2 of the embodiment of FIG. 1.
Figure 2A:
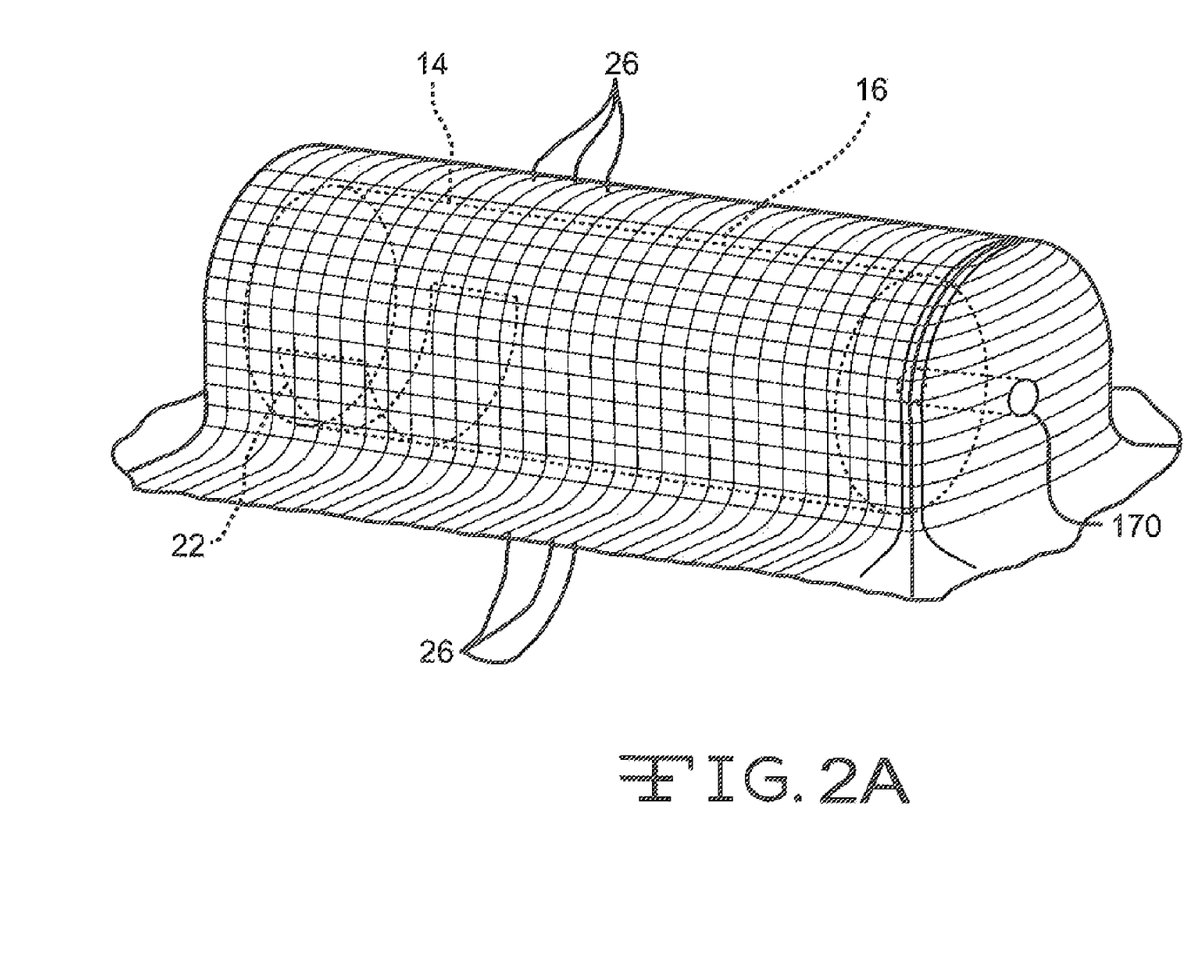
FIG. 2A shows a perspective view of one embodiment of a way to attach the tube member of FIG. 1 within the cavity of the rotor blade.

FIG. 2 shows a partial cross-section view through line 2-2 of the embodiment of FIG. 1, with dashed lines showing an outline of where opening 22 would be disposed. FIG. 2A shows a perspective view of one embodiment of a way to attach the tube member 14 of FIG. 1 within the cavity 16 of the rotor, blade 10. As shown, fibers 26, disposed around the tube member 14, may attach the tube member 14 within/to the cavity 16 of the rotor blade 10. In other embodiments, the tube member 14 may be attached within the cavity 16 of the rotor blade 10 by other attachment mechanisms such as bolts, pins, snap-fits, adhesive, weldments, and/or by varying mechanisms. The tube member 14 may be made of one or more of a metal, a composite, a fiber, and/or a matrix.

A plurality of weights 28 may be slide-ably inserted into, disposed within, and/or removed from the inner cavity 24 of the tube member 14 within the cavity 16 of the rotor blade 10 in order to balance the rotor. The weights 28 may be of the same or varying weights. Similarly, one or more low-weight spacers 30 may be slide-ably inserted into, disposed within, and/or removed from the inner cavity 24 of the tube member 14 with the cavity 16 of the rotor blade 10 in order to balance the rotor. Any combination of weights 28 and/or spacers 30 may be utilized to balance the rotor blade 10. For instance, weights 28 and/or spacers 30 may be added to the rotor blade 10 if the rotor blade 10 requires additional weight to be balanced with other rotor blades (not shown). Similarly, weights 28 and/or spacers 30 may be removed from the rotor blade 10 if the rotor blade 10 requires the subtraction of weight to be balanced with other rotor blades (not shown). Another option for changing the assembly weight is to substitute weights 28 for spacers 30 to balance the rotor assembly. Widths 32 and 34 of the weights 28 and spacers 30 may be just smaller than a width 35 of the inner cavity 24 of the tube member 14. In such manner, the weights 28 and spacers 30 may fit within the inner cavity 24 of the tube member 14, while at the same time being substantially prevented in the width direction 36 from bouncing around, due to rotor blade motions, and damaging the walls 38 of the cavity 24.

The weights 28 and/or spacers 30 disposed within the inner cavity 24 of the tube member 14 may be biased by a biasing member 40 towards an end 42 of the tube member 14. The biasing member 40 may comprise a spring, a jacking member, a twist member, and/or other types of biasing members. One side 50 of the biasing member 40 may be freely pressed against one end 52 of the tube member 14, and the other side 54 of the biasing member 40 may be pressed against the closest weight 28 or spacer 30. In such manner, the biasing member 40 may bias the weights 28 and/or spacers 30 towards end 42 of the tube member 14 in order to hold the weights 28 and/or spacers 30 in place within the inner cavity 24, to prevent the weights 28 and/or spacers from falling through openings 20 and 22 when the access panel 18 is removed, and to prevent the weights 28 and/or spacers 30 from substantial movement along direction 56 until the rotor is started and centrifugal force 19 becomes the primary force holding the weights 28 and spacers 30 in place. Moreover, end 42 of the tube member 14 may be attached to an outer end 58 of the rotor blade 10. As a result, when the rotor blade 10 spins centrifugal force 19, independently or collectively in conjunction with the biasing member 40, may hold the weights 28 and/or spacers 30 in place within the inner cavity 24 of the tube member 14 without the use of fastening mechanisms. By avoiding the use of fastening mechanisms to hold the weights 28 and/or spacers 30 in place, much time and/or cost may be saved.

Figure 3:
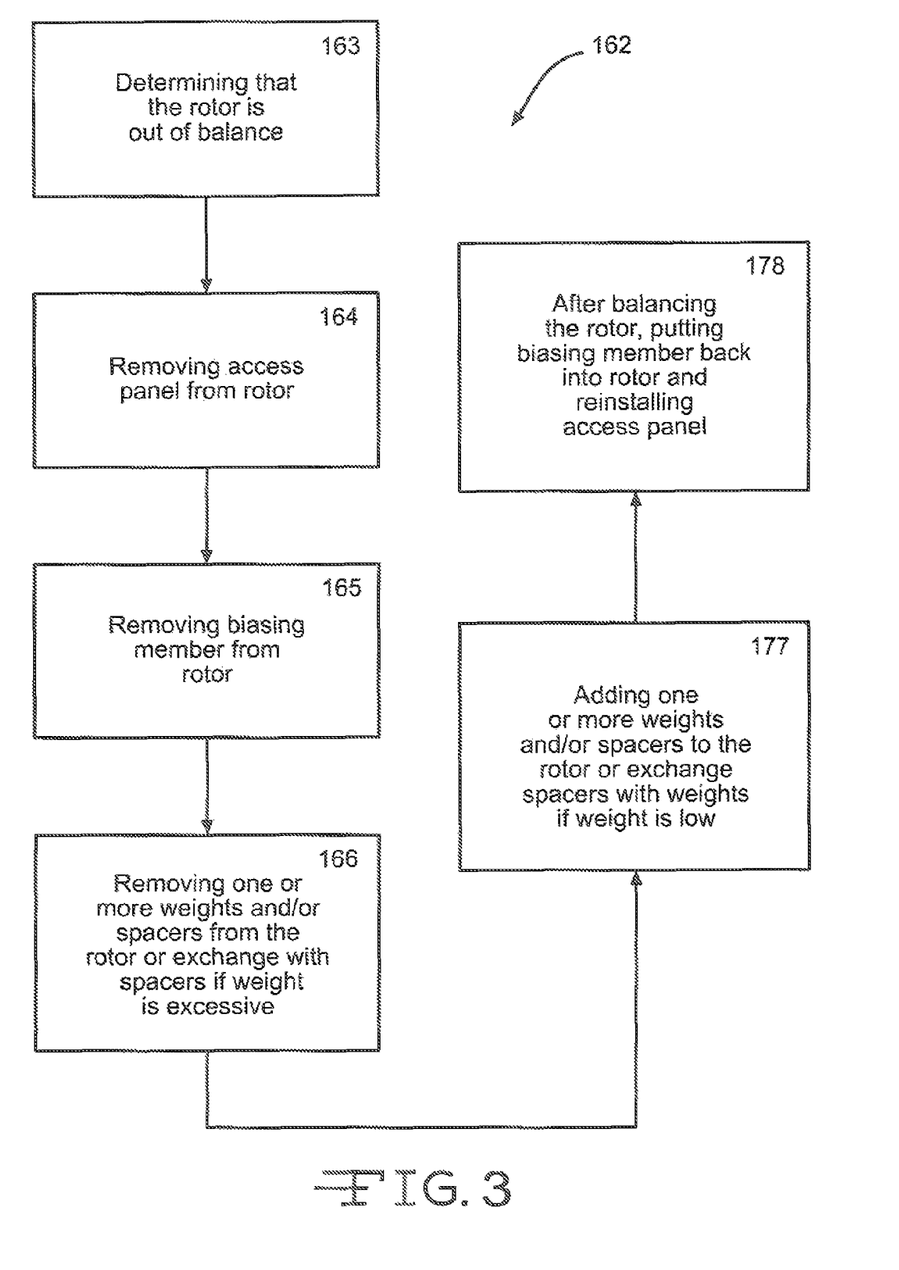
FIG. 3 shows a flowchart of one embodiment of a method of balancing a rotor blade.

FIG. 3 shows a flowchart of one embodiment of a method 162 of balancing a rotor blade 10. The rotor blade 10 may comprise a helicopter rotor blade. As shown in FIGS. 1 and 2, the rotor blade 10 may have a rotor blade balancing apparatus 12 disposed within a cavity 16 of the rotor blade 10. The rotor blade balancing apparatus 12 may comprise a tube member 14 having an internal cavity 24. A biasing member 40 may be pressed against one or more weights 28 and/or spacers 30 within the internal cavity 24. The biasing member 40 may comprise a spring, a jacking member, a twist member, and/or other types of biasing members. The weights 28 and/or spacers 30 may be held in place within the internal cavity 24 of the tube member 14 by at least one of the biasing member 40 and/or centrifugal force 19 due to spinning of the rotor blade 10. An access panel 18 may cover opening 20 in the rotor blade 10 and opening 22 in the tube member 14 leading into the internal cavity 24.

As shown in FIG. 3, in one step 163 of the method 162, a determination may be made that the rotor blade 10 is out of balance with one or more other rotor blades. This may be done visually or with instrumentation. In another step 164 of the method 162, as shown in FIG. 3 and in FIG. 4 which depicts the partial cross-sectional view of the embodiment of FIG. 2 with the access panel 18 being removed, the access panel 18 may be removed and/or moved from the rotor blade 10 and/or a tube member 14. The removal and/or movement of access panel 18 may provide access to the opening 20 in the rotor blade 10 and to corresponding opening 22 in the tube member 14 in order to provide access to the inner cavity 24 of the tube member 14.

Figure 4:
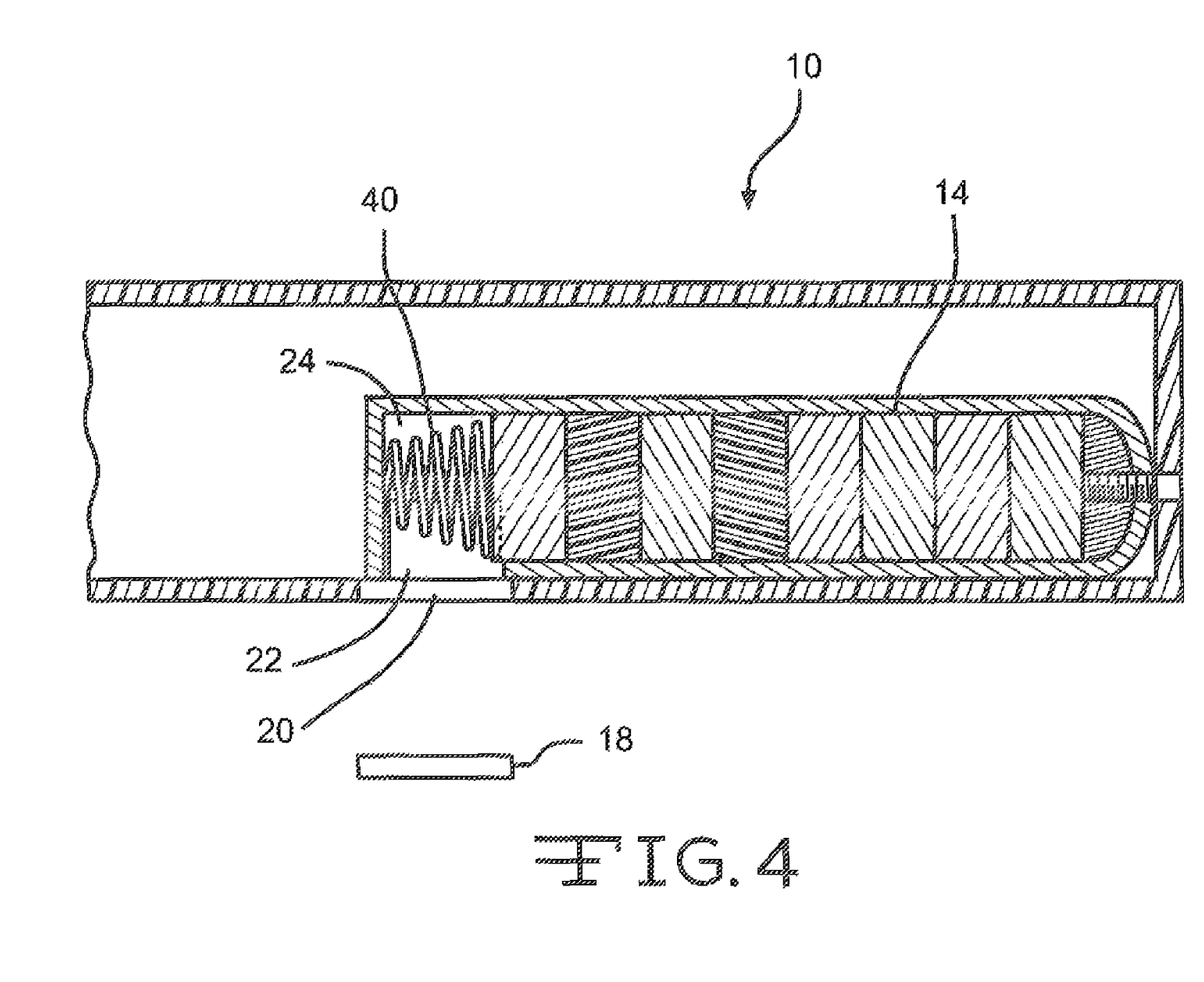
FIG. 4 shows the partial cross-sectional view of the embodiment of FIG. 2 with an access panel being removed and/or moved from the rotor blade and/or rotor blade balancing apparatus.
Figure 5:
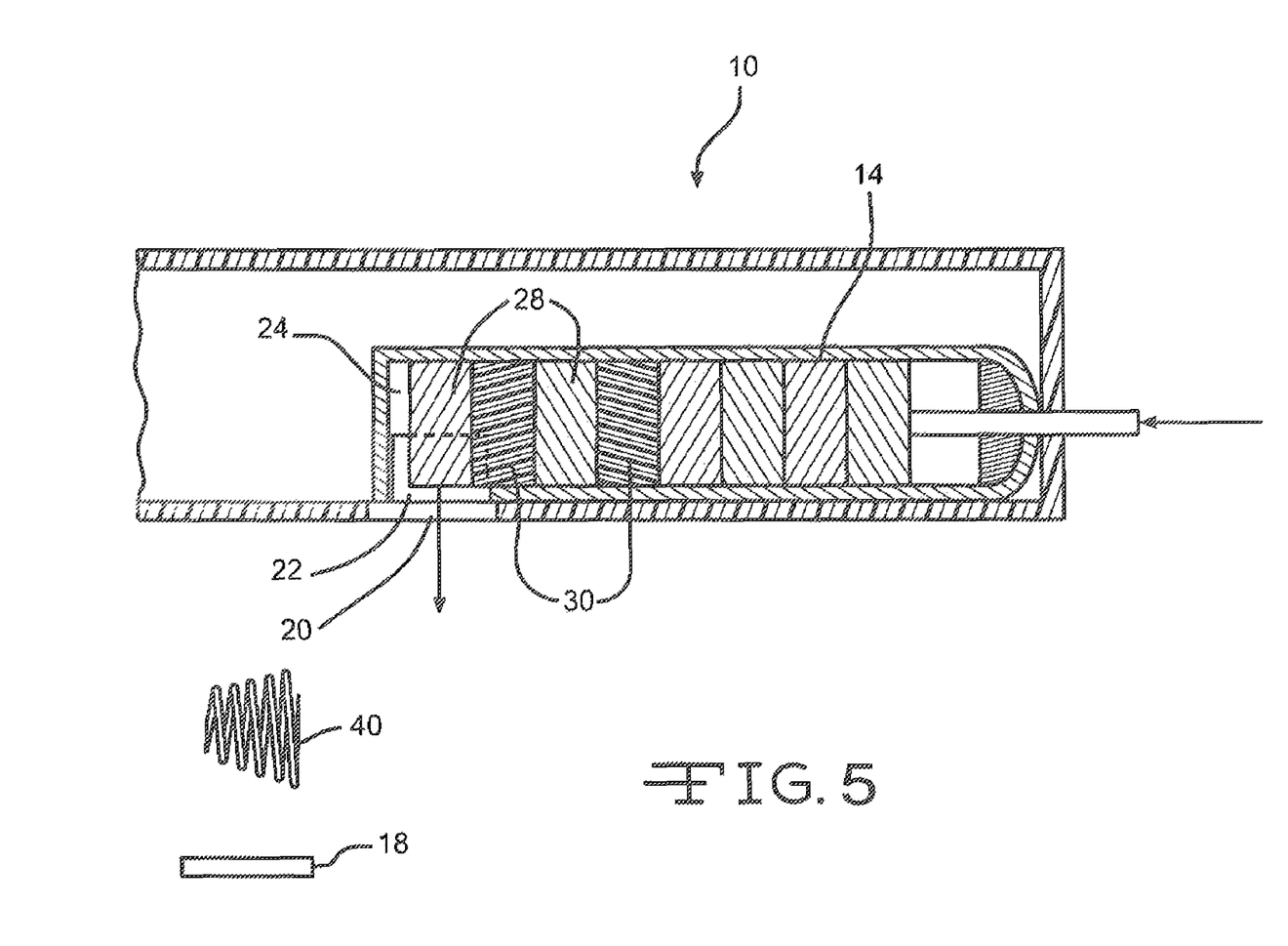
FIG. 5 shows the partial cross-sectional view of the embodiment of FIG. 4 with the biasing member being removed from the rotor blade balancing apparatus.

In step 165 of the method 162, as shown in FIG. 3 and in FIG. 5 which depicts the partial cross-sectional view of the embodiment of FIG. 4 with the biasing member 40 being removed, the biasing member 40 may be removed and/or moved from the inner cavity 24 of the tube member 14 by pulling it out of the openings 20 and 22. This may provide access to the weights 28 and/or spacers 30 within the internal cavity 24 of the tube member 14.

Figure 6:
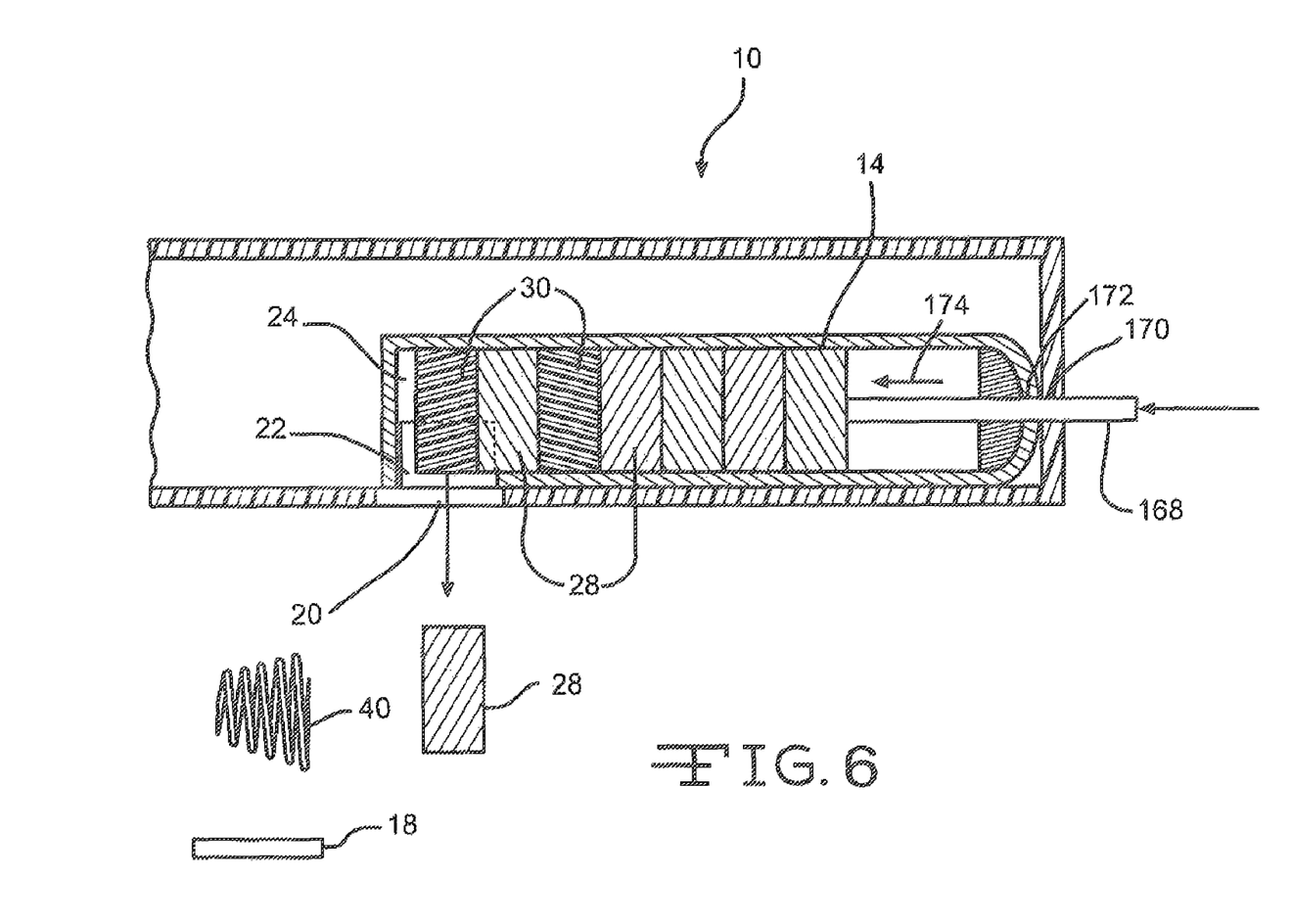
FIG. 6 shows the partial cross-sectional view of the embodiment of FIG. 5 with some of the weights and/or spacers being removed from the rotor blade balancing apparatus.

In step 166 of the method 162, as shown in FIG. 3 and in FIG. 6 which depicts the partial cross-sectional view of the embodiment of FIG. 5 with some of the weights 28 and/or spacers 30 being removed, if the rotor blade 10 is excessive in weight, one or more of the weights 28 and/or spacers 30 may be removed from the inner cavity 24 of the tube member 14 by taking them out of the openings 20 and 22. Alternatively, heavy weights 28 may be exchanged for spacers 30 or lighter weights 28. This may help in balancing the rotor assembly by removing excessive weight from the rotor blade 10. The removal of the one or more weights 28 and/or spacers 30 from the inner cavity 24 of the tube member 14 may be assisted by inserting a removing member 168 through a hole 170 in the rotor blade 10 and a hole 172 in the tube member 14 and pushing against the end weight 28 and/or spacer 30 to force the weights 28 and spacers 30 along direction 174. The removing member 168 may comprise a rod, a jacking member such as a screw threaded into a threaded insert in the end 42 of the tube member 14 or rotor blade 10, and/or a twisting member.

Figure 6A:
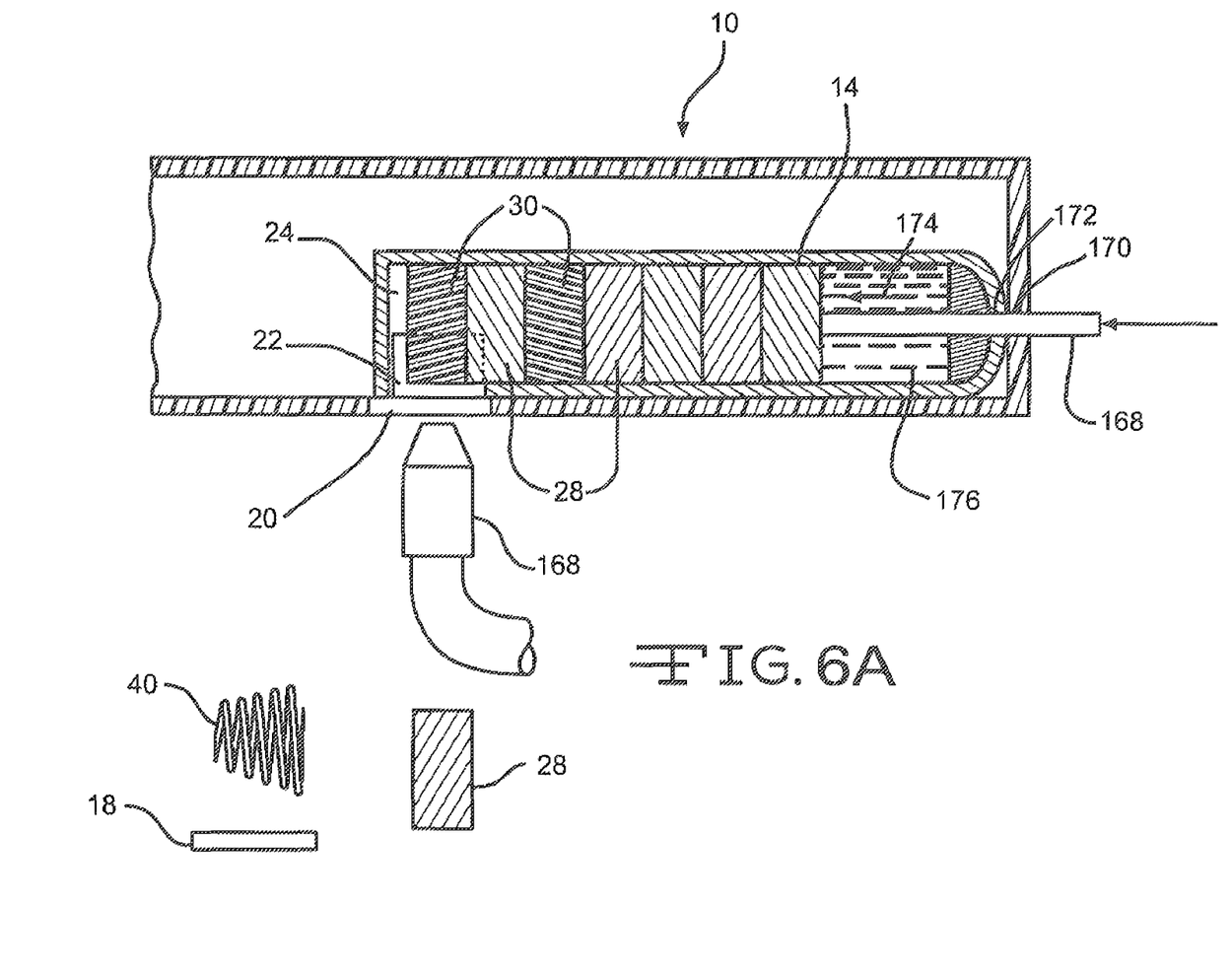
FIG. 6A shows the partial cross-sectional view of the embodiment of FIG. 6 with some of the weights and/or spacers being removed using a different removing member.

In another embodiment, as shown in FIG. 6A which depicts the partial cross-sectional view of the embodiment of FIG. 6 with some of the weights 28 and/or spacers 30 being removed using a different removing member 168, the removing member 168 may comprise a vacuum, and/or a pump. The removing member 168 may be disposed adjacent the openings 20 and 22 and the weights 28 and/or spacers 30 may be sucked out of the openings 20 and 22. Fluid 176 may also be injected into the cavity 24 of the tube member 14 through holes 170 and 172 to facilitate removal of the weights 28 and/or spacers 30.

Figure 6B:
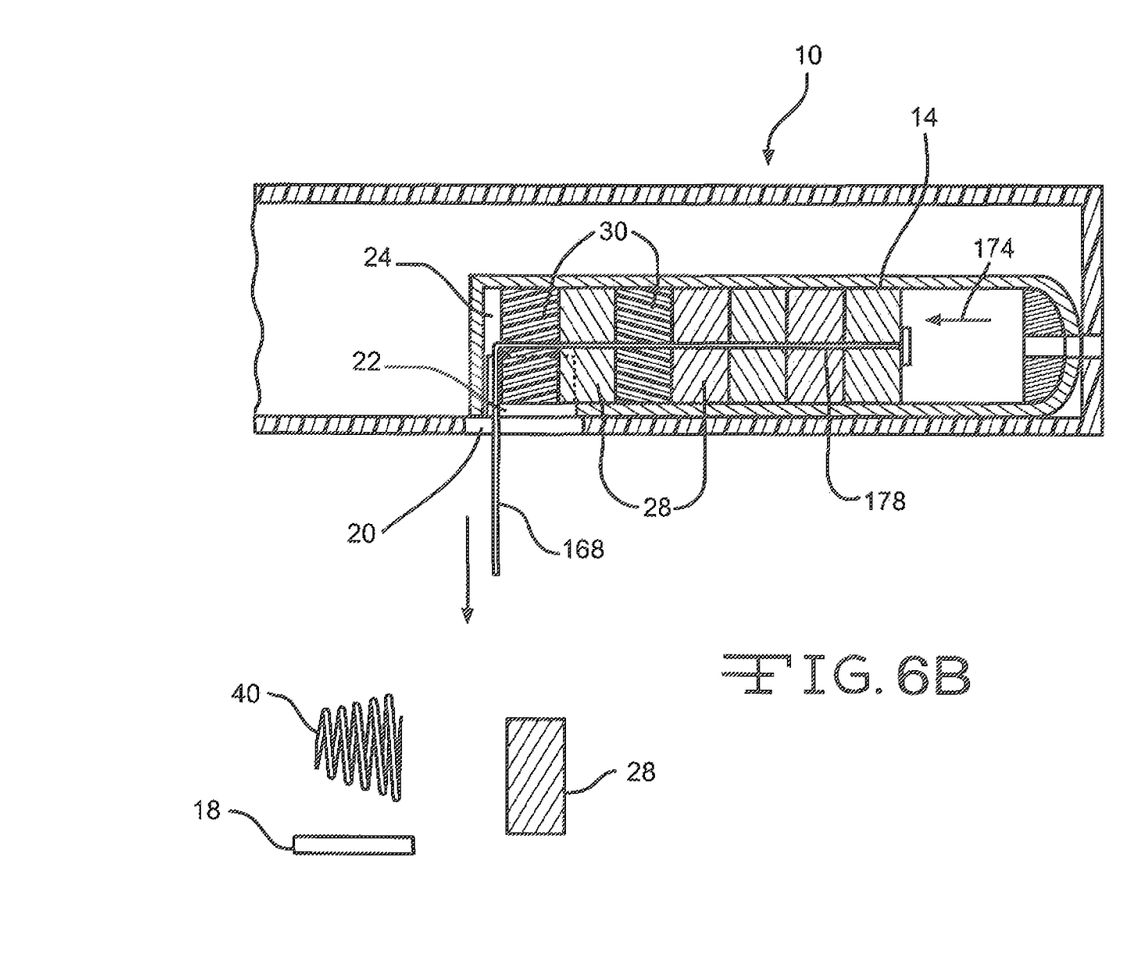
FIG. 6B shows the partial cross-sectional view of the embodiment of FIG. 6 with some of the weights and/or spacers being removed using still another removing member.

In still another embodiment, as shown in FIG. 6B which depicts the partial cross-section view of the embodiment of FIG. 6 with some of the weights 28 and/or spacers 30 being removed using still another removing member 168, the removing member 168 may comprise a wire. The removing member 168 may be attached to one or more of the weights 28 and/or spacers 30, may extend through holes 178 in the weights 28 and/or spacers 30, and may be used to pull one or more of the weights 28 and/or spacers 30 from the openings 20 and 22. In still other embodiments, any number and types of removing members 168 may be used to remove one or more of the weights 28 and/or spacers 30 from the openings 20 and 22 in order to balance the rotor blade 10.

Figure 7:
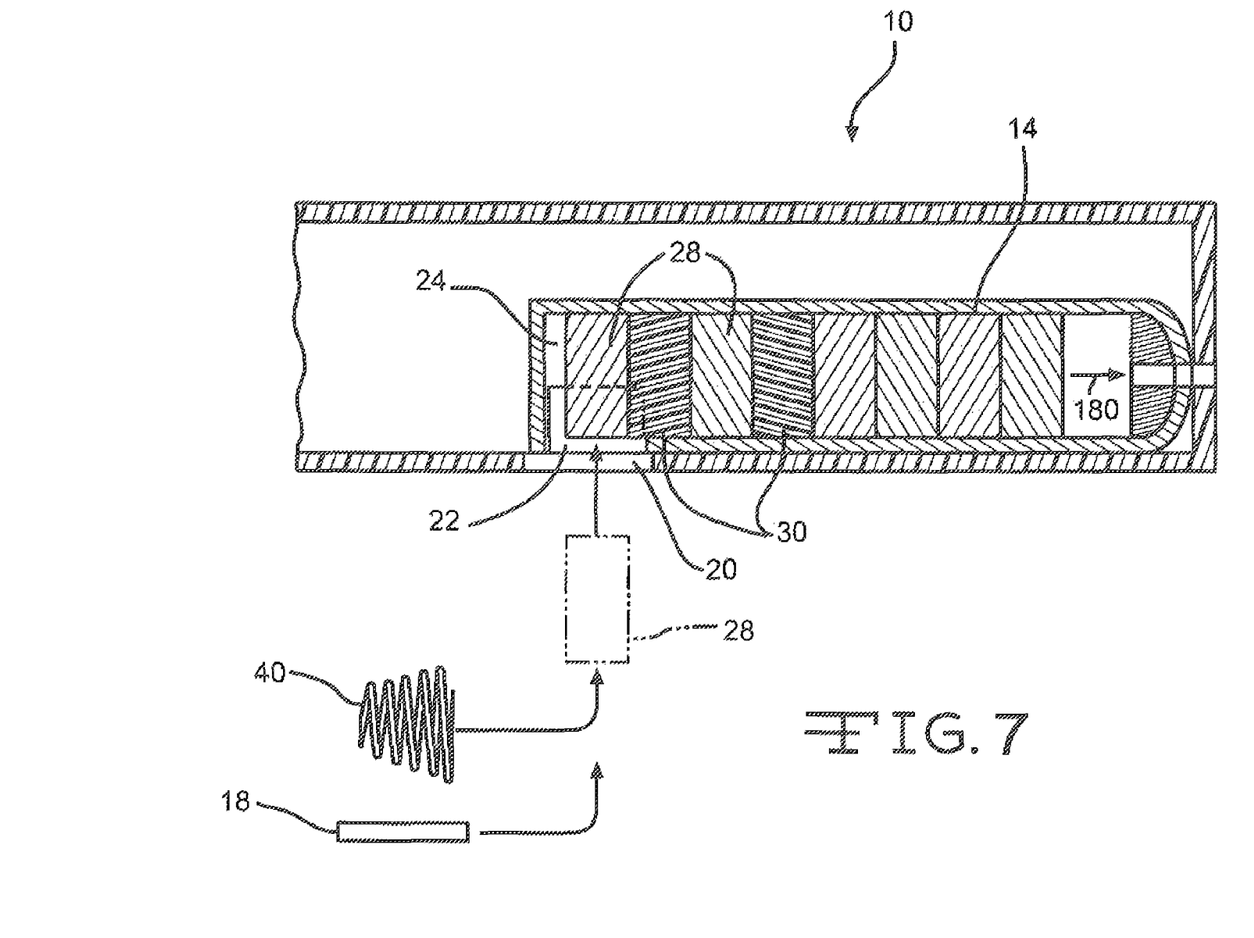
FIG. 7 shows the partial cross-sectional view of the embodiment of FIG. 5 with some weights and/or spacers being added to the rotor blade balancing apparatus.

In step 177 of the method 162, as shown in FIG. 3 and in FIG. 7 which depicts the partial cross-sectional view of the embodiment of FIG. 5 with some weights 28 and/or spacers 30 being added, if the rotor blade 10 is lacking weight, one or more weights 28 and/or spacers 30 may be added to the inner cavity 24 of the tube member 14 by inserting them through the openings 20 and 22 to push the weights 28 and/or spacers in direction 180. Alternately, weights 28 and spacers 30 may be removed, weights 28 substituted for spacers 30, and the new weights 28 and spacers 30 inserted back into the rotor blade 10. This may help in balancing the rotor blade 10 by adding extra weight.

In step 178 of the method 162, as shown in FIG. 3 and in FIG. 2, after balancing the rotor blade 10, the biasing member 40 may be put back into the inner cavity 24 of the tube member 14 and the access panel 18 may be subsequently reinstalled over the openings 20 and 22 to reseal the rotor blade 10.

One or more embodiments of the disclosure may reduce and/or eliminate one or more problems of one or more of the existing rotor blade balancing apparatus and/or methods of balancing a rotor blade. One or more embodiments of the disclosure may reduce weight due to the lack of necessary fastening elements, may make it easier to balance a rotor blade, may save time in balancing a rotor blade, may more safely balance a rotor blade, may reduce cost, may reduce the likelihood that balancing weight will come off the rotor blade, may reduce the number of rotor blades which need to be replaced, and/or may reduce one or more other types of problems of one or more of the existing rotor blade balancing apparatus and/or methods of balancing a rotor blade.

It should be understood, of course, that the foregoing relates to exemplary embodiments of the disclosure and that modifications may be made without departing from the spirit and scope of the disclosure as set forth in the following claims.

The invention claimed is:

1. A rotor blade balancing apparatus comprising:
   a member for being inserted into a cavity of a rotor blade, the member comprising opposed end surfaces, a top surface, a bottom surface, and side surfaces, wherein the top surface, bottom surface, and side surfaces define an inner cavity extending between the opposed end surfaces, one of the top or bottom surfaces comprises an opening, and the opposed end surfaces and side surfaces are closed;
   weights configured to be slide-ably inserted, through the opening, into the inner cavity of the member, and slide-ably removed from the inner cavity, through the opening, of the member to balance the rotor blade; and
   a biasing member for biasing the weights inserted within the inner cavity of the member towards one of the opposed end surfaces.

2. The rotor blade balancing apparatus of claim 1 wherein the rotor blade balancing apparatus comprises a helicopter rotor blade balancing apparatus.

3. The rotor blade balancing apparatus of claim 1 wherein the member comprises a cylinder.

4. The rotor blade balancing apparatus of claim 1 further comprising low-weight spacers which are configured to be slide-ably inserted, through the opening, into the inner cavity of the member, and slide-ably removed from the inner cavity, through the opening, of the member to balance the rotor blade.

5. The rotor blade balancing apparatus of claim 1 further comprising an access panel for attaching and detaching from at least one of the member or a rotor blade in order to gain access to the inner cavity of the member.

6. The rotor blade balancing apparatus of claim 1 wherein the biasing member comprises a spring.

7. The rotor blade balancing apparatus of claim 1 further comprising a removing member for removing the weights from the inner cavity of the member, the removing member comprising a vacuum, a pump, a rod, or a jacking member.

8. The rotor blade balancing apparatus of claim 1 wherein at least one of the biasing member or centrifugal force of the rotor blade is configured to hold the weights in place within the inner cavity of the member.

9. The rotor blade balancing apparatus of claim 1 wherein the member comprises fibers for attaching to the cavity of the rotor blade.

10. The rotor blade balancing apparatus of claim 1 wherein a width of the weights is smaller than a width of the inner cavity of the member.

11. A helicopter rotor blade balancing apparatus comprising:
    a helicopter rotor blade;
    a member disposed within a cavity of the helicopter rotor blade, the member comprising opposed end surfaces, a top surface, a bottom surface, and side surfaces, wherein the top surface, bottom surface, and side surfaces define an inner cavity extending between the opposed end surfaces, one of the top or bottom surfaces comprises an opening, and the opposed end surfaces and side surfaces are closed;
    weights, configured to be slide-ably inserted, through the opening, into the inner cavity of the member, and slide-ably removed from the inner cavity, through the opening, of the member in order to balance the helicopter rotor blade; and
    a biasing member for biasing the weights inserted within the inner cavity of the member towards one of the opposed end surfaces and towards an outer end of the helicopter rotor blade.

12. The helicopter rotor blade balancing apparatus of claim 11 wherein the member comprises a cylinder.

13. The helicopter rotor blade balancing apparatus of claim 11 further comprising low-weight spacers which are configured to be slide-ably inserted, through the opening, into the inner cavity of the member, and slide-ably removed from the inner cavity, through the opening, of the member to balance the helicopter rotor blade.

14. The helicopter rotor blade balancing apparatus of claim 11 further comprising an access panel for attaching and detaching from at least one of the member or the helicopter rotor blade in order to gain access to the inner cavity of the member.

15. The helicopter rotor blade balancing apparatus of claim 11 wherein the biasing member comprises a spring.

16. The helicopter rotor blade balancing apparatus of claim 11 further comprising a removing member for removing the weights from the inner cavity of the member, wherein the removing member comprises a vacuum, a pump, a rod, or a jacking member.

17. The helicopter rotor blade balancing apparatus of claim 11 wherein at least one of the biasing member or centrifugal force of the helicopter rotor blade is configured to hold the weights in place within the inner cavity of the member.

18. The helicopter rotor blade balancing apparatus of claim 11 wherein the member is attached directly to an end of the cavity of the helicopter rotor blade using fibers.

19. The helicopter rotor blade balancing apparatus of claim 11 wherein a width of the weights is smaller than a width of the inner cavity of the member.

20. A method for balancing a rotor blade comprising:
providing a rotor blade comprising a member disposed within a cavity of the rotor blade, the member comprising opposed end surfaces, a top surface, a bottom surface, and side surfaces, wherein the top surface, bottom surface, and side surfaces define an inner cavity extending between the opposed end surfaces, one of the top or bottom surfaces comprises an opening, and the opposed end surfaces and side surfaces are closed;
determining that the rotor blade is out of balance;
inserting weights through the opening into the inner cavity of the member within the cavity of the rotor blade; and
moving a biasing member against the weights within the inner cavity of the member to bias the weights towards one of the opposed end surfaces and towards an outer end of the rotor blade.

21. The method of claim 20 wherein the determining step comprises determining that a helicopter rotor blade is out of balance.

22. The method of claim 20 comprising the step of removing some of the weights from the inner cavity of the member through the opening using at least one of a removing member comprising a vacuum, a pump, a rod, or a jacking member.

23. The method of claim 20 wherein the biasing member comprises a spring.

24. The method of claim 20 further comprising the step of removing an access panel in order to gain access to the inner cavity of the member within the cavity of the rotor blade.

25. The method of claim 20 further comprising at least one of the biasing member or centrifugal force of the rotor blade holding the weights in place within the inner cavity of the member within the cavity of the rotor blade.

* * * * *